United States Patent [19]
Janik

[11] Patent Number: 5,413,711
[45] Date of Patent: May 9, 1995

[54] FUEL FILTER WITH INTERNAL VENT

[75] Inventor: Leon P. Janik, Suffield, Conn.

[73] Assignee: Stanadyne Automotive Corp., Windsor, Conn.

[21] Appl. No.: 155,101

[22] Filed: Nov. 19, 1993

Related U.S. Application Data

[63] Continuation of Ser. No. 900,116, Jun. 18, 1992, abandoned.

[51] Int. Cl.⁶ ............................................. B01D 35/01
[52] U.S. Cl. .................................... 210/300; 210/316; 210/436; 210/438
[58] Field of Search ............... 210/436, 438, 472, 300, 210/307, 311, 316

[56] References Cited

U.S. PATENT DOCUMENTS

| | | | |
|---|---|---|---|
| 3,234,064 | 3/1966 | White | 210/436 |
| 3,672,510 | 6/1972 | Saito et al. | 210/438 |
| 4,976,852 | 12/1990 | Jenik et al. | 210/86 |
| 5,017,285 | 5/1991 | Janik et al. | 210/438 |
| 5,084,170 | 1/1992 | Janik et al. | 210/232 |

Primary Examiner—Matthew O. Savage
Attorney, Agent, or Firm—Chilton, Alix & Van Kirk

[57] ABSTRACT

A fuel filter assembly employs a base which mounts a disposable filter cartridge. A pair of axial conduits provide fluid communication between the base and the cartridge. An orifice located in one of the conduits provides a bleed vent which controls the formation of air bubbles in filtered fuel exiting the fuel filter.

9 Claims, 3 Drawing Sheets

FUEL FILTER WITH INTERNAL VENT

This is a continuation of application Ser. No. 900,116, filed Jun. 18, 1992, now abandoned.

BACKGROUND OF THE INVENTION

This invention relates generally to filters for filtering and separating fluids. More particularly, the present invention relates to fuel filters for removing foreign particles and separating water from the fuel of the fuel supply system of an internal combustion engine.

Diesel fuel supplies frequently contain significant quantities of abrasive particles and water which present the potential for permanent damage to the components of the fuel injection pump, the fuel delivery system and the engine. Consequently, an effective fuel filter as a practical necessity is conventionally incorporated into the fuel supply system of a diesel engine. A multitude of conventional fuel filters employ a disposable filter cartridge which is replaced at pre-established intervals of filter usage. Such fuel filters perform the dual function of removing particulate material from the diesel fuel and separating water from the fuel.

U.S. Pat. Nos. 4,976,852 and 5,084,170, which are assigned to the assignee of the present invention, disclose fuel filter assemblies to which the present invention relates. The fuel filters employ a base which mounts a disposable filter cartridge. In some disclosed embodiments, the cartridge includes a dual stage filter system wherein fuel flows axially to a primary filter element for removing particulate matter and coalescing water droplets and axially to a second filter stage which functions as a water barrier. Filtered fuel flows axially and exits through an outlet passage of the base. The water may be collected in a sump and periodically removed. The cartridge is secured to the base by a collar which engages against a roll seam structure of the cartridge.

For most, if not all diesel fuel delivery systems, air pockets are present in the fuel filter as fuel circulates through the fuel filter. The air pockets normally form at the top of the fuel filter. Air bubbles tend to form in the fuel circulating through the filter due to the air pockets. For pressurized fuel delivery systems, the air pockets tend to disintegrate over time and/or the stream of bubbles present in the fuel is of a relatively small magnitude. The air pockets do not result in the formation of large air bubbles in the fuel supply partly due to the vapor pressure of the pressurized fuel. Consequently, for pressurized systems, air pockets in the fuel filter do not present a significant problem or obstacle to the circulation of fuel through the fuel filter and the delivery of fuel to the engine.

However, in vacuum applications, the formation of air pockets in the fuel circulating through the filter can present a more significant problem. The air pockets are much more resistant to absorption over time in vacuum systems. Moreover, the vacuum suction exerted on the fuel tends to result in ingestion of larger air bubbles which can become an obstacle to uniform fuel delivery to the engine. The air pockets may grow as a result of changing levels of fuel within the filter. The fuel level changes may be caused by vehicle maneuvering, such as turning, which produces centrifugal forces that result in sloshing of fuel within the filter. The air pockets within the filter may also enlarge over time under a vacuum system. Vacuum systems tend to be more susceptible to the ingestion into the fuel delivery stream of an air bubble which has a magnitude sufficient to produce a subsequent engine sputter.

SUMMARY OF THE INVENTION

Briefly stated, the invention in a preferred form is a fuel filter assembly which incorporates an internal vent to control air bubble formation and its adverse effects. The invention implements a bleed path within the filter to control the formation of air bubbles in the fuel supply exiting the filter. The fuel filter includes a base which has a fuel inlet and a fuel outlet. A conduit interiorly defines a first axial passage which communicates with the inlet. A second conduit surrounds the first conduit and defines a second axial passage. The second axial passage communicates with the outlet. A vent orifice opens radially through the second conduit. The orifice is dimensioned and located to limit the formation of air bubbles to a controlled magnitude. The filter cartridge, which is mountable to the base, includes at least one filter element. A fuel circulation path which traverses the element communicates between the first axial passage and the second axial passage.

In some embodiments, the second conduit has a plurality of orifices which substantially axially align. The orifices may have a diameter of approximately 0.050 inches. The orifice or orifices define a bleed path between an interiorally formed chamber of the cartridge and an upper portion of the second axial passage.

An object of the invention is to provide a new and improved fuel filter adaptable for use in filtering fuel supplied to an internal combustion engine.

Another object of the invention is to provide a new and improved fuel filter of efficient low cost construction which is especially adapted for incorporation into a fuel supply system which operates under a vacuum.

A further object of the invention is to provide a new and improved fuel filter which employs a disposable cartridge incorporating improved means for controlling the formation of air bubbles in the fuel supply exiting the filter.

Other objects and advantages of the invention will become apparent from the drawings and the specification.

DETAILED DESCRIPTION OF THE PREFERRED EMBODIMENTS

Figure 1:
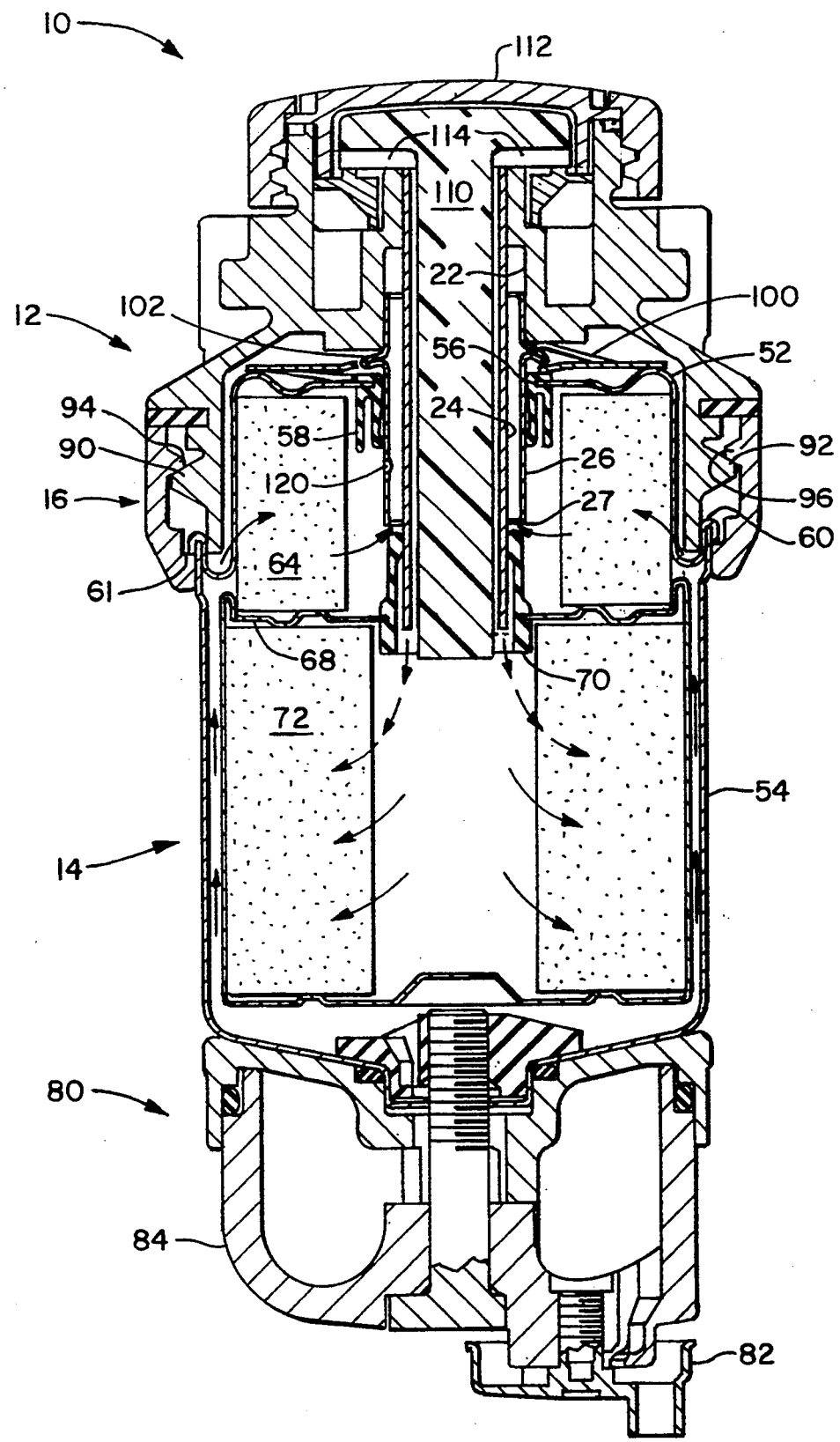
FIG. 1 is a sectional view of a fuel filter assembly in accordance with one embodiment of the invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14. The base 12 is disposed generally above the disposable filter cartridge 14 which is locked to the base by means of a retainer collar 16. The fuel filter assembly is especially adapted for incorporation into the fuel supply system of an internal combustion engine (not illustrated), such as a diesel engine, for removing particulate matter from fuel and separating the water from the fuel. The fuel filter assembly 10 is particularly adapted for incorporation into a fuel supply system which is operated under a vacuum.

The base 12 and the disposable cartridge 14 may assume a wide variety of configurations. For the disclosed embodiment, the base is an inverted cup-like receptacle which forms a skirt defining a lower receiving cavity for upper portions of a disposable cartridge. A central stepped axial bore 22 in the base closely receives an elongated sleeve-like conduit 24 and an outer concentric sleeve-like conduit 26 having an axial end 27. The conduits provide generally co-axial fluid communication between the base and the disposable cartridge.

Figure 4:
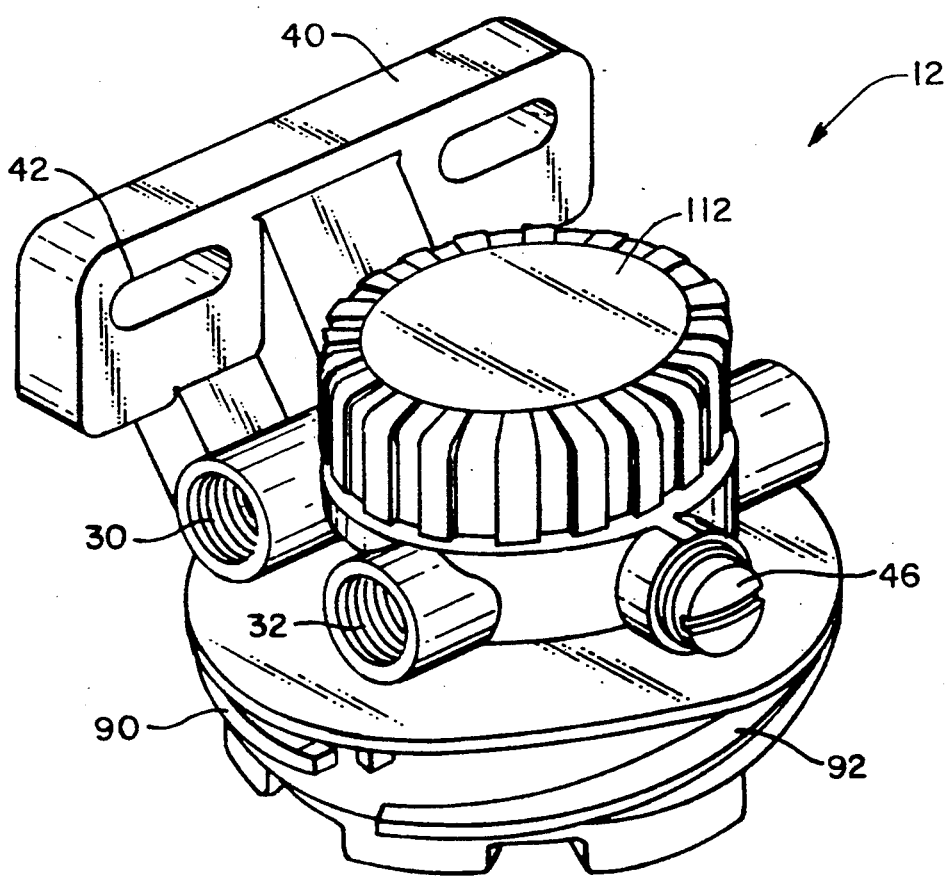
FIG. 4 is a perspective view of the base portion of the fuel filter assembly of FIG. 1.

With reference to FIG. 4, an inlet connector 30 at an upper side location of the base connects with the fuel line (not illustrated) to ultimately provide fluid communication through the interior passageway defined by the first conduit 24. An outlet connector 32 at an upper-side location of the base connects with the fuel line to provide external fluid communication from the axial fluid conduit defined between the first and second conduits 24 and 26.

An integral projecting bracket 40 which may include a pair of openings 42, 44 for anchoring the filter base to the engine header extends transversely from the base. Alternately, the base may not employ the described bracket structure but instead include a pair of fastener openings for receiving mounting fasteners. The base may also have an external air vent 46.

With reference to FIG. 1, the disposable filter cartridge 14 comprises a can-like enclosure formed by a pair of opposed lower and upper cup-like sections 52, 54. The sections are joined along a circumferential roll seam 60. The upper section 52, which is smaller in diameter than the lower section, is received by the base receptacle. The upper section 52 is dimensioned to be closely accomodated in the base receptacle. A central axial opening 56 in the upper section is dimensioned to receive the conduits 24 and 26. A sealing grommet 58 mounted at the opening 56 diametrically fluidically seals against the outer conduit 26.

The cartridge may employ a single stage filter assembly or a dual stage assembly as illustrated in FIG. 1. A secondary filter element 64 which has a continuous fan-shaped pleated configuration is mounted in the upper section. The lower end of the secondary element 64 is engaged by a multi-folded medial plate 68 having a central opening. A second sealing grommet 70 mounted at the opening diametrically seals against the first conduit 24. A primary filter element 72 also has a continuous fan-like configuration which engages the underside of the medial plate. The primary filter element 72 is housed in the lower section 54. A sump is formed at the bottom of the lower section to collect water which coalesces from the fuel.

In the illustrated embodiment, a modular bowl assembly generally designated by the numberal 80 is mounted at a lower portion of the cartridge for collecting the water from the sump. A drain-cock 82 is disposed in the lower portion of a collection bowl 84 for draining the water from the collection bowl 84. The collection bowl 84 may be identical in form and function to that described in co-pending U.S. patent application Ser. No. 07/748,775 filed on Aug. 22, 1991, which application is assigned to the assignee of the present invention and the disclosure of which is incorporated herein by reference.

The base may include a pair of integral outwardly projecting diametrically opposed ramps 90 and 92. The ramps ascend in spiral-like fashion around the base. The upper ends of the ramps are beveled. The collar includes a pair of diametrically disposed spiral followers 94 and 96 which integrally extend inwardly from the collar. The followers 94, 96 are dimensioned and positioned for engagement with the ramps 90, 92 so that the followers slidably engage and ascend the ramps upon alignment and angular rotation of the collar. A positive lock position is releasably maintained by the force of a spring 100 which is mounted to the base. The spring is retained by an integral crimped positioning ring 102 of the outer conduit 26. The foregoing ramp and spring configuration may be substantially identical to that disclosed in co-pending U.S. patent application Ser. No. 07/746,693 filed on Aug. 16, 1991, which application is assigned to the assignee of the present invention and the disclosure of which is incorporated herein by reference. The collar 16 includes an inwardly projecting annular shoulder 61 which engages the roll seam 60 of the cartridge for releasably locking the cartridge to the base.

A plug may also be secured by a cap 112 in an upper cavity of the base. The plug extends axially into the first conduit 24 and includes radial grooves 114 for directing the flow of fuel from the inlet 30 to the first conduit 24. The plug assembly may be substantially identical to that disclosed in co-pending U.S. patent application Ser. No. 07/745,871 filed on Aug. 16, 1991, which application is assigned to the assignee of the present invention and the disclosure of which is incorporated herein by reference.

With reference to FIG. 1, the conduit 26 has at least one orifice 120 which functions as a bleed vent to control the formation of air bubbles in the fuel exiting the fuel filter assembly via the conduit 26. In one embodiment, the orifice 120 has a diameter of approximately 0.050 inches. The orifice 120 is preferably located just below the sealing interface of sealing grommet 58. The axial distance of the orifice 120 from conduit end 27 is preferably at least equal to one half of the inner diameter of conduit 26.

The fuel enters the fuel filter assembly through the fuel inlet passage and exits the filter through the outlet passage. The general flow path of the fuel through the filter assembly is generally designated by the FIG. 1 arrows. It will be appreciated that the fuel flow path initially axially traverses through the interior of the inner conduit 24 and generally outwardly through the primary filter 72. The circulation path extends generally axially upwardly and generally radially through the secondary filter element with the return flow path traversing between the inner conduit 24 and the outer conduit 26.

Figure 5:
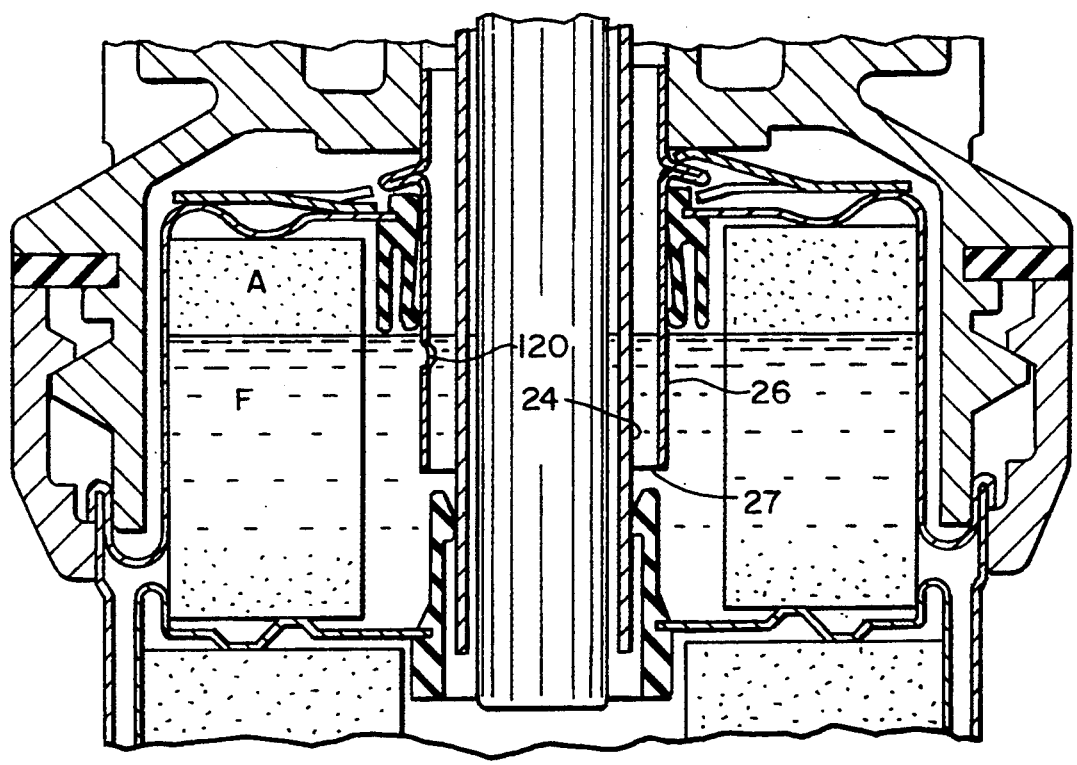
FIG. 5 is an enlarged fragmentary sectional view, partly in schematic, of the fuel filter assembly of FIG. 1 illustrating the invention for a first fuel level.

With reference to FIG. 5, when the level of fuel F is above the orifice 120, fuel bleeds into the return passageway between conduits 24 and 26. The lower portion of the return passageway is filled with fuel. The orifice allows for a generally continuous bleeding of fuel between the interior chamber formed by the secondary element 64 and the lower end of conduit 26, provided the level of fuel F in the filter is at or above the height of the orifice 120. When the filter is initially filled such as with a hand primer, the fuel level will not level off or deadhead within the filter cartridge until the fuel level covers the orifice 120. Therefore, the air space A above the fuel F will be limited by the position and dynamics of the orifice 120. The orifice 120 thus provides an efficient passage so that the portion of the conduit 26 below the fuel is submerged in fuel.

Figure 6:
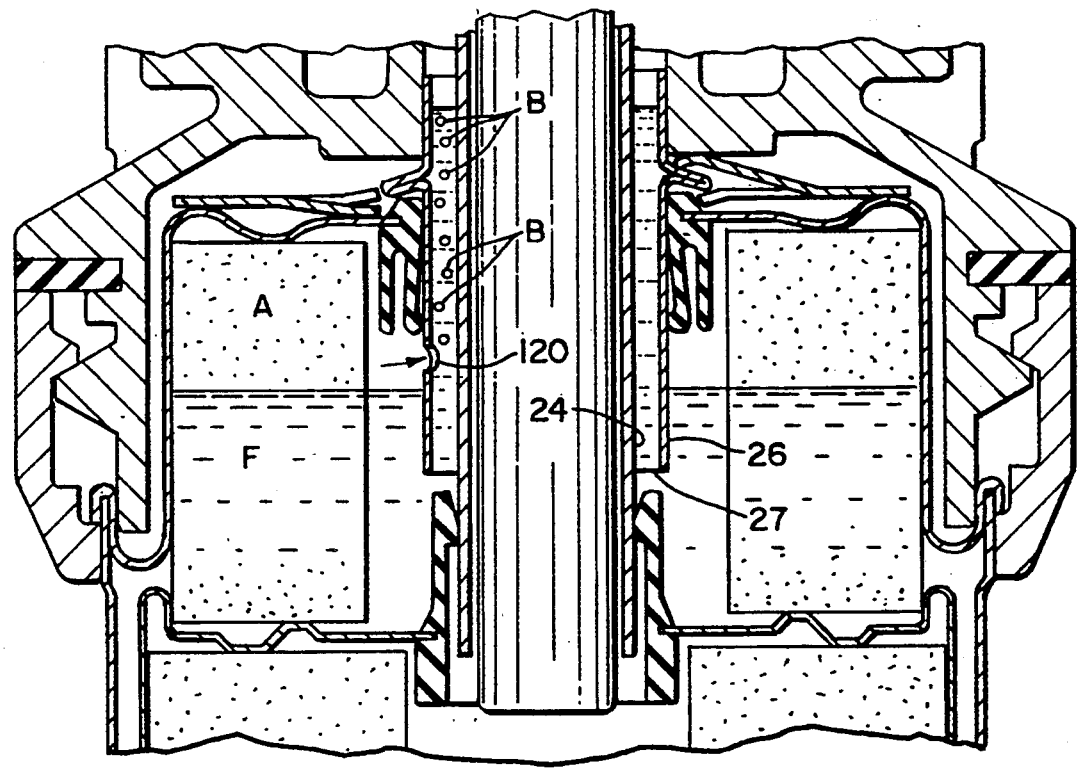
FIG. 6 is an enlarged fragmentary sectional view, partly in schematic, of the fuel filter assembly of FIG. 1 illustrating the invention for a second fuel level.

The orifice 120 functions as a bleed vent to control the formation of air bubbles in the return fuel flow path particularly as the level of the fuel in the filter changes. When the engine is started, a vacuum head draws fuel upwardly through the return passageway between conduits 24 and 26. If the level of fuel descends to a position which at least partially uncovers orifice 120 such as illustrated in FIG. 6, air will bleed in a controlled fashion through the orifice into the filtered fuel traversing the return passageway. The intermittent stream of air bubbles B will have no or a negligible effect on the delivery of fuel since the bubbles B will be relatively small in size. The bleed path provided by the orifice 120 functions to prevent a large "gulp" of air entering or being ingested into the fuel stream at the lower axial end of conduit 26 and to thus prevent the air bubble formation which cannot be easily consumed by the fuel injection pump. The orifice 120 also functions to prevent the formation of a large air pocket above the fuel level by providing the air bleed to the return passage.

Figure 2:
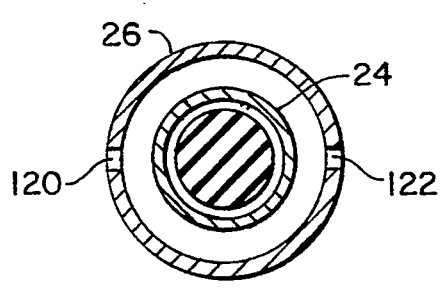
FIG. 2 is an enlarged fragmentary cross-sectional view of a modified embodiment of the fuel filter assembly of FIG. 1.
Figure 3:
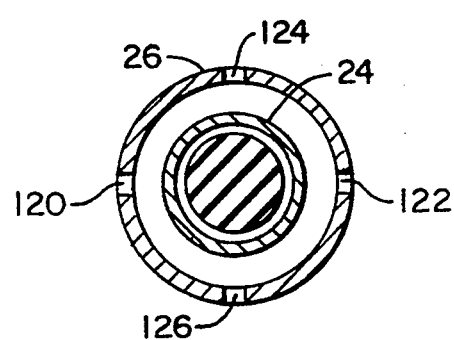
FIG. 3 is an enlarged fragmentary cross-sectional view of a second modified embodiment of the fuel filter assembly of FIG. 1.

Additional axially aligned and angularly spaced orifices 122, 124 and 126 may be provided in the conduit 26 as illustrated in FIGS. 2 and 3. These additional orifices function in substantially the same manner described for orifice 120.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly comprising:
   base means comprising a base having a fuel inlet, a fuel outlet, first conduit means for interiorly defining a first passage which extends along a first axis, first path means for providing fuel communication between said first passage and said inlet, second conduit means surrounding said first conduit means for defining a second passage having generally uniform outer and inner diameters, second path means for providing fuel communication between said second passage and said outlet, said second conduit means comprising vent means for defining a plurality of vent orifices, said second conduit means axially terminating at an inlet end, wherein said orifices are equidistantly axially spaced from said inlet end, and wherein the axial distance between said inlet end and said orifices is at least equal to one half of said second conduit means inner diameter and said second conduit means is devoid of any openings between said inlet end and said orifices;
   filter cartridge means mounted on said base means for filtering fuel, said cartridge means comprising a housing having an end portion defining an opening for said first and second conduit means and seal means for sealing said end portion with said second conduit means along a seal interface which is axially spaced from said vent orifices and adjacent thereto such that the second conduit means is devoid of any openings between said seal interface and said orifices, said cartridge means comprising at least one filter element and circulation path means defining a fuel path communicating with said first passage and said second passage and traversing said element; and
   retainer means for retaining said filter cartridge means with said base means.

2. The fuel filter assembly of claim 1 wherein each said orifice has a diameter of 0.050 inches.

3. A fuel filter assembly comprising:
   base means comprising a base having a fuel inlet, a fuel outlet, a first conduit defining a first passage communicable with said inlet and extending along a first axis, a second conduit having axially opposite first and second open ends and being parallel to said first conduit for defining a second passage communicable with said outlet, said second conduit having orifice means defining a plurality of orifices equidistantly axially spaced from said second open end, said second conduit being devoid of any openings axially located between said orifices and said first open end and between said orifices and said second open end;
   filter cartridge means comprising a housing having an end portion defining a second opening means for receiving said first and second conduits, said cartridge means being mountable on said base means for filtering fuel, said cartridge means comprising primary filter means enclosed in said housing and comprising a primary filter element defining a first chamber communicable with said first passage and a second chamber surrounding said first chamber, said cartridge means comprising secondary filter means comprising a secondary filter element defining a third chamber communicable with said second passage and first seal means for sealing said second conduit means with said end portion along a seal interface when said cartridge means is mounted to said base means, wherein said orifices are equidistantly axially spaced from said seal means and adjacent thereto such that said second conduit means is devoid of any openings between said seal interface and said orifices and said orifices provide fluid communication between said third chamber and said second passage.

4. The fuel filter assembly of claim 3 further comprising a medial partition located between said first and second filter elements and further comprising second seal means for sealing said first conduit with said medial partition and wherein said orifice means is disposed between said first seal means and second seal means when said cartridge means is mounted to said base means.

5. The fuel filter assembly of claim 3 wherein each said orifice has a diameter of 0.050 inches.

6. The fuel filter assembly of claim 3 wherein said second conduit has an inner diameter and said orifices are spaced from said second open end a distance at least equal to one half of the inner diameter.

7. A fuel filter assembly comprising:
   base means comprising a base having a fuel inlet, a fuel outlet, first conduit means for interiorly defining a first passage, first path means for providing fuel communication between said first passage and said inlet, second conduit means having opposed first and second open ends for defining a second passage extending along a central axis, second path means connected to said first open end for providing fuel communication between said second axial passage and said outlet, said second conduit means comprising a plurality of orifice means for defining orifices equidistantly axially spaced from said second open end, said second conduit means being devoid of openings axially located between said orifices and said first open end and between said orifices and said second open end;

filter cartridge means mountable on said base means for filtering fuel, said cartridge means comprising at least one filter element and circulation path means defining a fuel path communicating with said first passage and said second axial passage and traversing said element, said cartridge means having a chamber partially defined by said at least one filter element, which chamber fluidically communicates with said second passage via said second open end and said orifice means defines a plurality of bleed paths between said chamber and said second passage.

8. The fuel filter assembly of claim 7 wherein each said orifice has a diameter of 0.050 inches.

9. The fuel filter assembly of claim 7 wherein said second conduit means has an inner diameter and the distance between said second open end and said orifices is at least equal to one half of the diameter.

* * * * *